United States Patent
Stucker

(10) Patent No.: US 11,044,235 B2
(45) Date of Patent: *Jun. 22, 2021

(54) TOPOLOGY HIDING OF A NETWORK FOR AN ADMINISTRATIVE INTERFACE BETWEEN NETWORKS

(75) Inventor: Brian Stucker, Sachse, TX (US)

(73) Assignee: Ribbon Communications Operating Company, Inc., Westford, MA (US)

(*) Notice: Subject to any disclaimer, the term of this patent is extended or adjusted under 35 U.S.C. 154(b) by 491 days.

This patent is subject to a terminal disclaimer.

(21) Appl. No.: 13/470,712

(22) Filed: May 14, 2012

(65) Prior Publication Data

US 2012/0226814 A1 Sep. 6, 2012

Related U.S. Application Data

(63) Continuation of application No. 12/004,214, filed on Dec. 20, 2007, now Pat. No. 8,218,459.

(51) Int. Cl.
*H04L 29/06* (2006.01)
*H04L 12/715* (2013.01)

(52) U.S. Cl.
CPC .......... *H04L 63/0407* (2013.01); *H04L 45/04* (2013.01)

(58) Field of Classification Search
None
See application file for complete search history.

(56) References Cited

U.S. PATENT DOCUMENTS

| | | | |
|---|---|---|---|
| 7,102,996 B1* | 9/2006 | Amdahl | H04L 12/4641 370/230 |
| 7,983,228 B1* | 7/2011 | Choksi | 370/338 |
| 8,218,459 B1* | 7/2012 | Stucker | 370/261 |
| 8,442,485 B2* | 5/2013 | Chowdhury | H04L 12/1439 370/328 |
| 2002/0080752 A1* | 6/2002 | Johansson | H04L 29/06 370/338 |
| 2002/0194378 A1* | 12/2002 | Foti | H04L 29/06 709/246 |
| 2003/0009561 A1* | 1/2003 | Sollee | H04L 29/06 709/227 |
| 2003/0058839 A1* | 3/2003 | D'Souza | H04L 29/06027 370/352 |
| 2003/0093563 A1* | 5/2003 | Young | H04L 12/4633 709/245 |
| 2004/0181686 A1* | 9/2004 | Krause | H04L 12/66 709/200 |
| 2004/0213150 A1* | 10/2004 | Krause | H04L 12/6418 370/229 |
| 2005/0063411 A1* | 3/2005 | Wang et al. | 370/437 |

(Continued)

*Primary Examiner* — Gregory B Sefcheck
*Assistant Examiner* — Joshua Smith
(74) *Attorney, Agent, or Firm* — Fogarty LLP

(57) ABSTRACT

An administrative interface is provided between a first network and a second network, where the administrative interface is separate from one or more communications session signaling interfaces between the first network and second network. At least one of authorization, authentication, and accounting messages is communicated over the administrative interface. A module associated with the administrative interface is provided to perform topology hiding of the first network such that topology information of the first network is hidden from the second network.

4 Claims, 3 Drawing Sheets

(56) References Cited

U.S. PATENT DOCUMENTS

| | | | |
|---|---|---|---|
| 2005/0185647 A1* | 8/2005 | Rao | H04L 12/4641 370/392 |
| 2006/0072542 A1* | 4/2006 | Sinnreich | H04L 12/2854 370/351 |
| 2006/0155871 A1* | 7/2006 | Ilkka et al. | 709/238 |
| 2007/0077912 A1* | 4/2007 | Mahajan | H04W 8/22 455/410 |
| 2007/0165622 A1* | 7/2007 | O'Rourke | H04L 12/287 370/389 |
| 2007/0209067 A1* | 9/2007 | Fogel | 726/11 |
| 2008/0046963 A1* | 2/2008 | Grayson | H04L 12/66 726/1 |
| 2008/0310432 A1* | 12/2008 | Ranjan | H04L 47/10 370/401 |
| 2009/0129388 A1* | 5/2009 | Akhtar et al. | 370/392 |
| 2010/0274908 A1* | 10/2010 | Koskelainen | H04L 45/00 709/227 |

* cited by examiner

TOPOLOGY HIDING OF A NETWORK FOR AN ADMINISTRATIVE INTERFACE BETWEEN NETWORKS

CROSS-REFERENCE TO RELATED APPLICATION

This application is a continuation of U.S. application Ser. No. 12/004,214, filed Dec. 20, 2007 now U.S. Pat. No. 8,218,459, which is hereby incorporated by reference.

TECHNICAL FIELD

The invention relates generally to providing topology hiding of a first network for an administrative interface between the first network and a second network.

BACKGROUND

Many types of communications can be performed over data networks (wireless and/or wireline networks), including electronic mail, web browsing, file downloads, electronic commerce transactions, voice or other forms of real-time, interactive communications, and others. To enable the establishment of communications sessions in a network, various control functions are deployed in the network. Some standards bodies have defined subsystems within communications networks that include such control functions. One such standards body is the Third Generation Partnership Project (3GPP), which has defined an Internet protocol (IP) multimedia subsystem (IMS) that includes various control functions for provision of IP multimedia services, including audio, video, text, chat, or any combination of the foregoing.

An IP multimedia subsystem can be used in conjunction with a wireless network, such as a wireless network according to the GSM (Global System for Mobile) or UMTS (Universal Mobile Telecommunications System) standard, as defined by 3GPP, or a wireless network according to CDMA 2000 (Code Division Multiple Access 2000), as defined by 3GPP2. An IP multimedia subsystem can also be used with wireline networks. In the 3GPP2 context, the equivalent of the IP multimedia subsystem is sometimes referred to as a multimedia domain (MMD) network. In the wireline context, the equivalent of an IP multimedia subsystem is sometimes referred to as a Next Generation Networks (NGN).

When a mobile station roams to a visited network, signaling messages exchanged with the roaming mobile station can be communicated between the visited network and a home network of the mobile station. The visited network and home network are usually provided by different service providers. Therefore, security is a concern between the visited network and the home network, since it would be undesirable for the home network to be able to learn network topology information associated with the visited network based on the exchanged signaling messages of the mobile station. To address this, topology hiding is typically performed, such as by providing an IMS application level gateway (ALG), sometimes referred to as a topology hiding internetwork gateway (THIG), in a proxy call session control function (P-CSCF) or interconnect border control function (IBCF) of the IMS network. The P-CSCF and IBCF are part of the call signaling interface between the visited network and the home network. The IMS ALG implemented in the P-CSCF or IBCF is used to obscure network topology information of the visited network for the call signaling interface.

However, an issue that has arisen is that the topology hiding provided by the IMS ALG is often insufficient to protect network topology information.

SUMMARY

In general, according to an embodiment, topology hiding is performed for an administrative interface between a first network and a second network, where the administrative interface is separate from communications session signaling interface(s) between the first and second networks. The administrative interface can be used for communicating authorization, authentication, and/or accounting messages.

Other or alternative features will become apparent from the following description, from the drawings, and from the claims.

DETAILED DESCRIPTION

Figure 1:
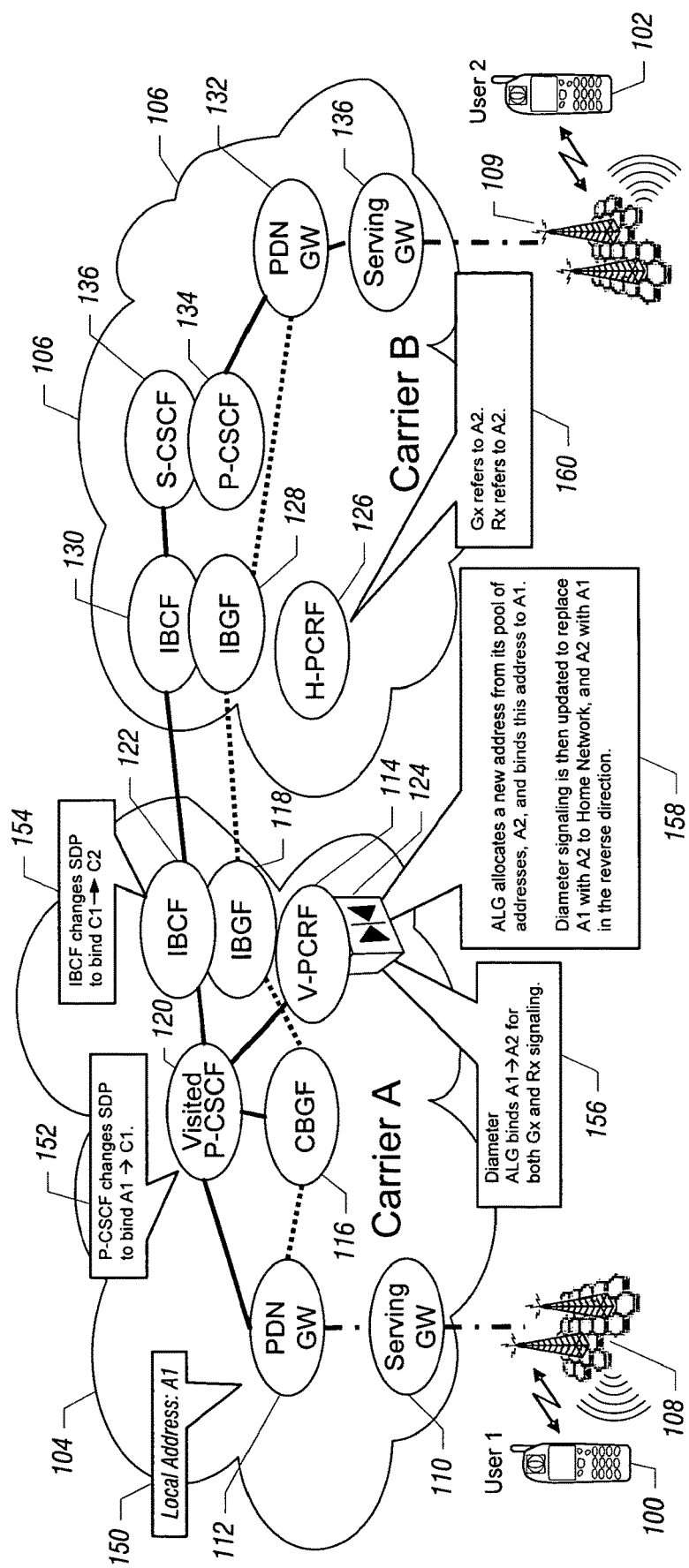
FIGS. 1 and 2 illustrate example network arrangements and signal flows according to some embodiments.

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments, for enhanced security, topology hiding is provided at an administrative interface between a first network and a second network, where the administrative interface is separate from one or more communications session signaling interfaces between the first network and second network. Topology hiding allows topology information (e.g., network address, port, identifier, etc.) of one network to be hidden from another network. A communications session signaling interface refers to a signaling interface between the first and second networks through which control messages can be exchanged for establishing communications sessions, such as voice-over-IP (Internet Protocol) call sessions, video conferencing sessions, chat sessions, web browsing sessions, and so forth. Examples of control messages that can be communicated through a communications session signaling interface for establishing a communications session are SIP (Session Initiation Protocol) messages, as described by RFC (Request for Comments) 3261, entitled "SIP: Session Initiation Protocol," dated June 2002.

SIP is an application-layer control signaling protocol for creating, modifying, and terminating multimedia sessions (any one or more of a voice session, or audio session, video session, text chat session, or any combination of the foregoing). SIP is used as the call control signaling protocol by control functions of the first and second networks, in accordance with some implementations. Note that in other implementations, other types of control messages can be used for establishing communications sessions, where such other control messages are exchanged between first and second networks through the communications session signaling interface.

The first and second networks can be Internet Protocol (IP) multimedia subsystem (IMS) networks, as defined by 3GPP (Third Generation Partnership Project). An IMS network includes various control functions for provision of IP multimedia services, including audio, video, text, chat, or any combination of the foregoing. Alternatively, the first and second networks can be according to the System Architecture Evolution (SAE) architecture, which is an evolution of the IMS architecture that adds support for non-3GPP access systems as well as other features. Features of the SAE architecture are described in 3GPP TS 23.402. Note that in other implementations, other types of networks according to other protocols can be employed.

The first network can be considered the serving network for a mobile station, while the second network can be considered the home network for the mobile station. Note that the second network can also be considered a serving network for a second mobile station, while the first network is considered the home network for the second mobile station. When a mobile station is in a serving network, the mobile station typically may have to exchange control messages with one or more nodes of the home network to enable establishment of a communications session with another network element. As noted above, such control messages for establishing the communications session is provided through one or more communications session signaling interfaces between the serving network and the home network. For enhanced security between the serving network and the home network, various modules are provided to perform topology hiding such that the internal network topology of the serving network is hidden from the home network (or vice versa). Topology hiding at the communications session signaling interface is performed by stripping or encrypting certain information, such as identifier information, address information, or other information, in control messages that are passed through the communications session signaling interface.

In accordance with some embodiments, to further enhance security between a serving network and a home network, topology hiding is also provided in an administrative interface between the serving network and the home network. The administrative interface between the serving network and the home network is used for communicating administrative messages for performing various administrative tasks, including any one or more of authorization, authentication, or accounting tasks. In general, authentication refers to confirming that a user who is requesting services is a valid user of the network services requested. Authentication is typically accomplished by presenting an identity and/or credentials of the user, such as passwords, tokens, digital certificates, etc. Authorization refers to granting specific types of service to a user, subject to predefined restrictions, quality of service (QoS) specifications, bandwidth/traffic management, etc. Accounting generally refers to tracking consumption of network resources by a user, such that the tracked consumption can be used for management, planning, billing, or other purposes.

Exchanges of administrative messages to perform any of the above tasks through the administrative interface can be performed prior to establishment of a communications session, or during a communications session. For example, administrative messages can be exchanged to determine quality of service (QoS) settings for a particular user. Alternatively, administrative messages can be exchanged through the administrative interface when a mobile station roams to a visited network and attempts to access services at the home network.

In one specific embodiment, the administrative messages exchanged between modules of the serving network and the home network over the administrative interface are Diameter messages according to the Diameter Protocol. One version of the Diameter Protocol is described in RFC 3588, entitled "Diameter Base Protocol," dated September 2003. The Diameter Protocol defines messages that are used for performing authentication, authorization, and accounting tasks. Note, however, in other implementations, other types of administrative messages can be used between a serving network and home network.

FIG. 1 shows an example network arrangement that includes a first mobile station 100 and a second mobile station 102, where the first mobile station 100 is connected to a first network 104, and the second mobile station 102 is connected to a second network 106. Note that the modules depicted in FIG. 1 are provided for purposes of example. In other implementations, other modules can be used.

It is assumed that the first network 104 is a serving network for the mobile station 100, whereas the second network 106 is the home network of the mobile station 100. The mobile station 100 is attached to an access network 108, which can be a wireless access network, for example. Examples of wireless access networks include CDMA 2000 (Code Division Multiple Access 2000), GSM (Global System for Mobile), UMTS (Universal Mobile Telecommunications System), WiMAX, or other types of wireless access networks. Similarly, the mobile station is attached to an access network 109.

In the example of FIG. 1, it is assumed that services are provided by the serving network 104 to the visiting mobile station 100. As explained further below, the topology hiding at the administrative interface performed in such a scenario is slightly different from the topology hiding performed when services are provided by the home network (106) of the mobile station 100. This alternative scenario is described in the context of FIG. 2 below.

In the ensuing discussion, focus is made on the mobile station 100 that has roamed into visited network 104, and whose home network is network 106. However, note that the same principles can be applied to other mobile stations in other networks.

The access network 108 is connected to a serving gateway 110 in the serving network 104. The serving gateway 110 has various functions, including mobility anchoring for inter-3GPP mobility, packet routing and forwarding, and other functions. The serving gateway 110 is connected to a packet data network (PDN) gateway 112 in the serving network. The PDN gateway 112 has various functions, including mobility anchor for mobility between 3GPP access networks and non-3GPP access networks, policy enforcement, charging support, and other functions.

The PDN gateway 112 is connected to a V-PCRF (visiting policy control and charging rules function) 114 and a CBGF (core border gateway function) 116. A PCRF provides policy control and charging rules. Generally, the PCRF provides network control regarding service data flow detection, gating, QoS (quality of service), and flow-based charging.

The packet data network gateway 112 is also connected to a visited P-CSCF (proxy call session control function) 120, which is the first call control contact point for a terminal in the network. Among the tasks performed by the P-CSCF 120 is forwarding of call control messages (e.g., SIP messages) to other control functions, call control message compression and decompression, and determination of which network a particular call control message should be routed to.

The visited P-CSCF 120 is connected to an interconnect border control function (IBCF) 122, which issues policy instructions regarding the media plane (the plane associated with communication of media traffic). The IBCF 122 applies policy-based controls to the flow of multimedia across transport networks. The IBCF 122 also provides topology hiding in the communications session signaling interface. For example, the IBCF 122 can also implement an internetwork gateway (THIG) to perform the topology hiding. Alternatively, the THIG can be implemented in the P-CSCF 120.

An interconnect border gateway function (IBGF) 118 is also present to control the transport boundary at layers 3 and 4 between the first and second networks 104, 106. The IBGF 118 can also act as a pinhole firewall and a network address translator.

Although the various functions depicted in the networks 104, 106 are represented as separate blocks, note that at least some of the functions can be deployed on a common network node.

In accordance with some embodiments, an application level gateway 124 is provided in the V-PRCF 114 to perform topology hiding of the network topology of the serving network 104 at the administrative interface. In the embodiment of FIG. 1, the administrative interface is provided between the V-PCRF 114 and a home PCRF (H-PCRF) 126 in the home network 106. Administrative messages (e.g., Diameter messages) can be exchanged between the V-PCRF 114 and the H-PCRF 126 to perform authentication, authorization, and/or accounting tasks.

In some embodiments, the ALG 124 is a Diameter ALG; however, other types of ALGs can be used in other embodiments. One way of performing topology hiding is to substitute a local address (of network 104) with another address. For example, the Diameter ALG 124 can allocate a new address from a Diameter ALG pool of addresses, and can bind this new address to the local address reported from the PDN gateway 112 or the visited P-CSCF 120. Diameter messages sent from the V-PCRF 114 to the H-PCRF 126 in the home network 106 are updated to replace (substitute) the local address (e.g., A1) with the new address (e.g., A2). In the reverse direction, from H-PCRF 126 to V-PCRF 114, Diameter messages are updated by replacing A2 with A1.

In other embodiments, other types of topology hiding can be performed, including encryption of address information in administrative messages, hashing of addresses in administrative messages, or removal (stripping) of addresses from administrative messages. Note that although reference is made to substituting, encrypting, hashing, or removal of addresses (e.g., IP addresses) in administrative messages, it is noted that in alternative implementations, topology hiding can be performed by substituting, encrypting, hashing, or removing port information, such as user datagram protocol (UDP) port information, or other identifier information in the administrative messages.

In accordance with some embodiments, topology hiding can be accomplished by using existing Diameter data types (referred to as attribute value pairs or AVPs). In such embodiments, new AVPs do not have to be defined to support topology hiding.

As further depicted in FIG. 1, the home network 106 (from the perspective of the mobile station 100) also includes an IBGF 128 (which interacts with the IBGF 118 in the serving network 104) and an IBCF 130 (which interacts with the IBCF 122 in the serving network 104). The home network 106 also includes a PDN gateway 132, and a P-CSCF 134. Moreover, the network 106 also includes a serving CSCF (S-CSCF) 210, which handles session control for a communications session. Note that SIP messages, for example, can be exchanged between P-CSCF and S-CSCF for performing communications session establishment and control.

The network 106 also includes a serving gateway 136 that is connected to the access network 109. The serving gateway 136 is connected to the PDN gateway 132.

FIG. 1 also shows various task boxes that illustrate tasks performed by the various modules of FIG. 1. Box 150 indicates that the local address used by the PDN gateway 112 for mobile station 100 is address A1. Moreover, box 152 indicates that the visited P-CSCF 120 changes the body portion of a signaling message, e.g., a SIP message, to bind A1 to another address C1 (in other words, the body portion is updated by replacing A1 with C1). In one embodiment, the body portion of a SIP message is a Session Description Protocol (SDP) portion. SDP is used for describing multimedia sessions for purposes of session announcement, session invitation, and so forth.

As further depicted in FIG. 1, box 154 indicates that the IBCF 122 changes the SDP portion of a signaling message to bind C1 to C2 (in other words, address C1 in the SDP portion of a signaling message is substituted with address C2). Messages sent from the IBCF 122 in the serving network 104 to the IBCF 130 in the home network 106 would thus contain address C2. This provides topology hiding in the communications session signaling interface between the IBCF 122 and IBCF 130.

Note that in an alternative implementation, if an IMS ALG was not provided or invoked at the visited P-CSCF 120, then the change from address A1 to C1 would not have occurred. In this case, the IBCF 122 would then substitute the local address A1 in the SDP portion of the signaling message with address C2.

In accordance with some embodiments, in the administrative interface between V-PCRF 114 and H-PCRF 126, the Diameter ALG 124 is used to bind local address A1 to address A2 for certain administrative messages (see box 156). In the example of FIG. 1, this binding is for administrative message provided over both the Gx interface and the Rx interface. The Rx interface resides between a PCRF and an application function (AF). One example of an application function is the visited P-CSCF 120. The Gx interface resides between the PCRF and a PCEF (policy and charging enforcement function), which performs data flow detection, policy enforcement, and flow-based charging functionalities. Although reference is made to Gx and Rx signaling in the FIG. 1 example, note that the Diameter ALG 124 can perform topology hiding for other types of signaling over an administrative interface.

As further depicted in FIG. 1, box 158 indicates that the Diameter ALG 124 allocates a new address (A2) from its pool of addresses, and binds this new address to local address A1 that is reported from the PDN gateway 112 or the visited P-CSCF 120. Box 158 also indicates that diameter signaling sent from the V-PCRF 114 to H-PCRF 126 is updated to replace local address A1 with external address A2. Box 158 also indicates that the Diameter ALG 124 converts address A2 with A1 in the reverse direction (signaling from the H-PCRF 126 to the V-PCRF 114).

FIG. 1 also shows a box 160 that indicates that the Gx interface and the Rx interface of the H-PCRF 126 both refer to the external address A2 reported by the V-PCRF. Thus, in administrative messages sent from the H-PCRF 126 to the V-PCRF, the external address A2 is used.

Figure 2:
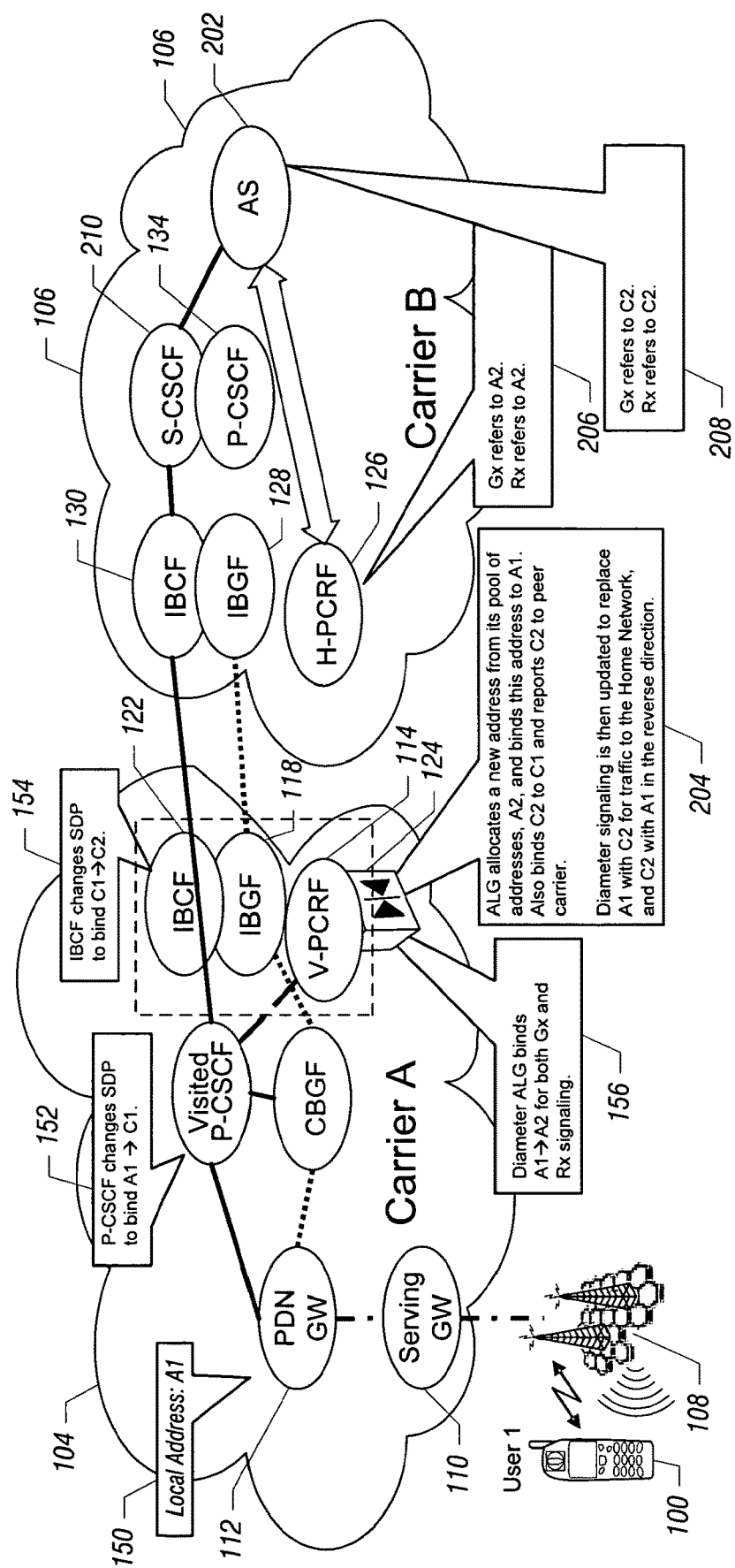

FIG. 2 shows a different scenario in which services for the roaming mobile station 100 are provided by the home network 106 rather than by the serving network 104 (as was the case for FIG. 1). In this example, services can be provided by an application server 202 in the home network 106.

In the example of FIG. 1, the topology hiding procedures performed at the communications session signaling interface and the administrative interface are independent of each other. At the communications session signaling interface, the topology hiding binds local address A1 to C2. On the other hand, at the administrative interface, the topology hiding binds local address A1 to A2, which is different from C2 at the communications session signaling interface.

However, if services are provided at the home network, such as by the application server 202 in FIG. 2, then coordination is performed between the communications session signaling interface and the administrative interface such that coordination of the topology hiding procedures at the communications session signaling interface and the administrative interface can be provided. Task boxes 150, 152, and 154 in FIG. 2 indicate the same tasks as the corresponding boxes in FIG. 1 for performing topology hiding at the communications session signaling interface.

At the administrative interface, task box 156 also indicates that the Diameter ALG 124 binds A1 to A2 for both Gx and Rx signaling. However, box 204 in FIG. 2 indicates that the Diameter ALG 124 also coordinates with the IBCF 122 to determine that address C2 should be the address reported to the peer H-PCRF 126. Diameter signaling sent from the V-PCRF 114 to the H-PCRF 126 is thus updated to replace address A1 with C2, and Diameter signaling from the H-PCRF 126 to the V-PCRF 114 is updated to replace C2 with A1 in the reverse direction. Note that this topology hiding at the administrative interface performed in FIG. 2 is different from the topology hiding at the administrative interface performed in FIG. 1.

With the topology hiding performed in FIG. 2, the H-PCRF 126 in the home network 106 refers to C2 (rather than to A2 in the FIG. 1 example) at both the Gx and Rx interfaces. Box 208 in FIG. 2 also indicates that, at the application server 202, the Gx and Rx interfaces both refer to address C2.

Figure 3:
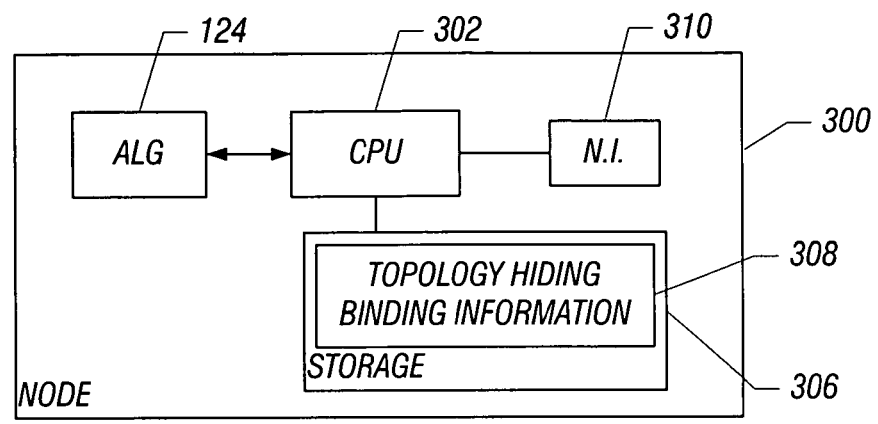
FIG. 3 is a block diagram of a node in which an application level gateway for providing topology hiding is provided, according to some embodiments.

FIG. 3 shows an example node 300 that includes the ALG 124 of FIGS. 1 and 2. The node 300 can be a computer node. Note that the V-PCRF 114 can also be deployed on the node 300, in some implementations. The ALG 124 can be a software module that is executable on one or more central processing units (CPUs) 302. The CPU(s) 302 is (are) connected to a storage 306, which can store topology hiding binding information 308 used by the ALG 124 to perform topology hiding when communicating messages over the administrative interface with a node in another network. The node 300 has a network interface 310 to enable communication over the administrative interface with another node.

Note that the other nodes of the networks of FIGS. 1 and 2 can be similarly arranged as in FIG. 3.

By using topology hiding at an administrative interface between different networks, "leakage" of topology information of one network to another network over the administrative interface can be avoided. In this manner, enhanced security can be achieved.

Instructions of software described above (e.g., ALG 124 in FIGS. 1 and 2) are executed on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system for hiding topology information, the system comprising:
   a first node and a second node configured to hide topology information of a network visited by a mobile station from a home network of the mobile station in messages comprising a communication session, wherein the messages comprise control messages and administrative messages;
   the first node in the network visited by the mobile station, comprising:
      at least one processor;
      a network interface configured to send the administrative messages to the home network of the mobile station, the administrative messages comprising at least one of authorization, authentication, and accounting messages to perform administrative tasks related to the communication session; and
      a module executable on the at least one processor of the first node and configured to hide the topology information of the visited network by modifying topology information identifying the visited network in the administrative messages; and
   the second node in the network visited by the mobile station, comprising:
      at least one other processor;
      a second network interface configured to send the control messages to the home network to establish the communications session; and
      a second module executable on the at least one other processor of the second node and configured to hide the topology information of the visited network by modifying topology information identifying the visited network in the control messages.

2. The system of claim 1, wherein the topology hiding by the administrative interface of the visited network comprises at least one of:
   substituting the topology information for the visited network in the administrative messages with a topology information of the home network of the mobile station;
   encrypting the topology information in the administrative messages;
   hashing the topology information in the administrative messages; and removing the topology information from the administrative messages.

3. The system of claim 1, wherein the control messages comprise Session Initiation Protocol (SIP) messages.

4. The system of claim 1, wherein the administrative messages are configured to be sent over an administrative interface implemented on the first node, wherein the administrative messages are transmitted via a policy control and charging rules function (V-PCRF) of the visited network and a policy control and charging rules function (H-PCRF) of the home network.

* * * * *